(12) United States Patent
Chomik et al.

(10) Patent No.: US 7,757,467 B2
(45) Date of Patent: *Jul. 20, 2010

(54) DISPOSABLE CASSETTE FOR INCREMENTAL WITHDRAWAL OF TUBULAR PLASTIC WITH MALODOR-COUNTERACTANT CAPACITY

(75) Inventors: Richard S. Chomik, Middlesex, NJ (US); Rosemary Knuth, Congers, NY (US); Caryl Yeager, Madison, NJ (US)

(73) Assignee: Playtex Products, Inc., Westport, CT (US)

( * ) Notice: Subject to any disclaimer, the term of this patent is extended or adjusted under 35 U.S.C. 154(b) by 1657 days.

This patent is subject to a terminal disclaimer.

(21) Appl. No.: 10/418,896

(22) Filed: Apr. 17, 2003

(65) Prior Publication Data

US 2003/0213804 A1 Nov. 20, 2003

Related U.S. Application Data

(60) Provisional application No. 60/373,143, filed on Apr. 17, 2002.

(51) Int. Cl.
*B65B 9/12* (2006.01)
*B65B 1/04* (2006.01)

(52) U.S. Cl. .............................. 53/567; 53/459; 53/469; 53/576; 206/303; 206/397; 206/409; 220/908.2

(58) Field of Classification Search ................. 220/908, 220/908.1, 908.2, 908.3; 206/204, 303, 397, 206/409, 554; 53/459, 469, 567, 576
See application file for complete search history.

(56) References Cited

U.S. PATENT DOCUMENTS

| | | | |
|---|---|---|---|
| 1,226,634 A | 5/1917 | Briese | |
| 1,239,427 A | 9/1917 | Bunnel et al. | |
| 1,265,148 A | 5/1918 | Warren | |
| 2,169,055 A | * 8/1939 | Overshiner | 239/54 |
| 2,411,430 A | 11/1946 | Hodson | |
| 3,077,457 A | 2/1963 | Kulka | |
| 3,516,846 A | 6/1970 | Matson | |
| 3,516,941 A | 6/1970 | Matson | |
| 3,536,192 A | 10/1970 | Couper | |
| 3,579,416 A | 5/1971 | Schrenk | |
| 3,655,129 A | 4/1972 | Seiner | |
| 3,741,253 A | 6/1973 | Brax et al. | |
| 3,762,454 A | * 10/1973 | Wilkins, Jr. | 383/1 |
| 3,778,383 A | 12/1973 | Schibler et al. | |
| 3,923,005 A | 12/1975 | Fry et al. | |
| 4,009,253 A | 2/1977 | Schleppnik | |
| 4,087,376 A | 5/1978 | Foris et al. | |
| 4,101,711 A | 7/1978 | Stillman | |
| 4,187,251 A | 2/1980 | Schleppnik | |
| 4,251,386 A | 2/1981 | Saeki et al. | |

(Continued)

FOREIGN PATENT DOCUMENTS

CA 2019173 12/1990

(Continued)

*Primary Examiner*—John Ricci
(74) *Attorney, Agent, or Firm*—Ohlandt, Greeley, Ruggiero & Perle, L.L.P.

(57) ABSTRACT

A container holding a supply of plastic, tubular stock for the incremental withdrawal of portions thereof, said container comprising a malodor counteractant.

5 Claims, 3 Drawing Sheets

U.S. PATENT DOCUMENTS

| | | | |
|---|---|---|---|
| 4,254,169 A | 3/1981 | Schroeder | |
| 4,254,179 A | 3/1981 | Carson, III et al. | |
| 4,284,444 A | 8/1981 | Bernstein et al. | |
| 4,310,512 A | 1/1982 | Schleppnik | |
| 4,351,876 A | 9/1982 | Doi et al. | |
| 4,427,110 A | 1/1984 | Shaw, Jr. | |
| 4,612,221 A | 9/1986 | Biel et al. | |
| 4,622,221 A | 11/1986 | Schleppnik | |
| 4,705,707 A | 11/1987 | Winter | |
| 4,716,061 A | 12/1987 | Winter | |
| 4,865,371 A | 9/1989 | Egberg | |
| 4,869,049 A | 9/1989 | Richards et al. | |
| 4,898,633 A | 2/1990 | Doree et al. | |
| 4,909,986 A | 3/1990 | Kobayashi et al. | |
| 4,934,529 A | 6/1990 | Richards et al. | |
| 4,959,207 A | 9/1990 | Calhoun | |
| 4,989,727 A | 2/1991 | Gordon | |
| 5,022,553 A * | 6/1991 | Pontius | 206/205 |
| 5,039,243 A | 8/1991 | O'Brien | |
| 5,056,293 A | 10/1991 | Richards et al. | |
| 5,125,526 A | 6/1992 | Sumanis | |
| 5,129,735 A | 7/1992 | Neal et al. | |
| 5,147,055 A | 9/1992 | Samson et al. | |
| 5,158,199 A * | 10/1992 | Pontius | 220/825 |
| 5,174,462 A * | 12/1992 | Hames | 220/87.1 |
| 5,534,105 A | 7/1996 | Boyd | |
| 5,534,165 A | 7/1996 | Pilosof et al. | |
| 5,535,913 A | 7/1996 | Asbach et al. | |
| 5,590,512 A | 1/1997 | Richards et al. | |
| 5,640,931 A | 6/1997 | Markham | |
| 5,655,680 A | 8/1997 | Asbach et al. | |
| 5,659,933 A | 8/1997 | McWilliams | |
| 5,718,887 A | 2/1998 | Wolf et al. | |
| 5,813,200 A | 9/1998 | Jacoby et al. | |
| 5,860,959 A | 1/1999 | Gent | |
| 5,950,818 A * | 9/1999 | Paulsen | 206/205 |
| 6,128,890 A * | 10/2000 | Firth | 53/567 |
| 6,129,715 A | 10/2000 | Cunningham | |
| 6,129,716 A * | 10/2000 | Steer | 604/333 |
| 6,150,004 A | 11/2000 | Oikawa et al. | |
| 6,170,240 B1 | 1/2001 | Jacoby et al. | |
| 6,202,877 B1 | 3/2001 | La Torre et al. | |
| 6,258,423 B1 | 7/2001 | Giori | |
| 6,370,847 B1 | 4/2002 | Jensen et al. | |
| 6,516,588 B2 | 2/2003 | Jensen et al. | |
| 6,612,099 B2 | 9/2003 | Stravitz | |
| 2002/0162304 A1 | 11/2002 | Stravitz | |
| 2008/0121640 A1* | 5/2008 | Chomik et al. | 220/495.07 |

FOREIGN PATENT DOCUMENTS

| | | |
|---|---|---|
| CA | 1298191 | 3/1992 |
| CA | 1318234 | 5/1993 |
| GB | 1156725 | 7/1969 |
| GB | 2041319 | 9/1980 |
| GB | 2048206 | 12/1980 |
| WO | WO 02/051788 | 7/2002 |

* cited by examiner

DISPOSABLE CASSETTE FOR INCREMENTAL WITHDRAWAL OF TUBULAR PLASTIC WITH MALODOR-COUNTERACTANT CAPACITY

RELATED APPLICATIONS

This patent application claims the benefit of the filing date of U.S. Provisional Patent Application No. 60/373,143, filed Apr. 17, 2002, the entire contents of which are hereby expressly incorporated by reference.

BACKGROUND OF THE INVENTION

1. Field of the Invention

The present invention relates to a container which provides for incremental withdrawal of tubular plastic. More particularly, the present invention is directed to such a container which incorporates in or on the container housing and/or the enclosed tubular plastic a composition having malodor-counteractant activity.

2. Description of the Related Art

Many items in life are associated with smells generally found to be unpleasant to the olfactory sense ("malodor"). The fact is that the disposal of these items in everyday life can be a hassle. For example, babies generate a significant number of feces/urine-laden diapers which due to the smell require frequent trips to the outside garbage can. Likewise, certain foods, like meats and fish, generate smells within a few days of being placed into a kitchen trash receptacle often requiring the emptying of the kitchen trash receptacle long before it is filled with trash. Similarly, pets such as cats generate considerable amounts of excrement-laden litter that often require more frequent trips to the outside garbage receptacle than would otherwise be necessary.

Malodors are frequently comprised of amines, thiols, sulfides, short chain aliphatic and olefinic acids, aldehydes and esters. For example, indole, skatole, and methanethiol are found in toilet odors, perpidine and morpholine in urine, and pyridine and triethyl amine in garbage odors, such as fish.

Most trash receptacles are fitted with a lid designed to contain odors when the lid is closed. However, most lids are not designed to be perfectly air-tight in respect of their receptacles, or after repeated use become less-than air tight, permitting malodor to emanate from the receptacles even when they are closed. Even with the most air-tight containers, upon opening the container, the noxious odors escape into the area giving an extremely unpleasant sensation to the person attempting to add more trash to the receptacle. Location of the receptacles in a remote location is inconvenient and generally unsatisfactory.

Another problem with trash receptacles is that they tend to retain noxious odors even after the trash is ultimately removed. After a period of time a thorough and complete cleaning of such receptacles is necessary.

Several approaches have been used to counteract malodors. The simplest of these techniques involves inhibition of the formation of the malodor itself, by for example exposing the otherwise odorous material to antimicrobials and enzyme inhibitors. A more common technique, however, is masking which is performed by superimposing a stronger pleasant odor over a malodor. Suppression of malodor may also be effectuated by exposing an odorous material to a compound that causes a negative deviation of Raoult's law. In another technique, cross-adaptation, the sensation of the malodor is impaired by blocking malodor olfactory receptors. Malodor may also be eliminated by exposing the malodor to a compound that either reacts with the malodor components to form non-odorous products, or that absorbs or adsorbs, as for example in a molecular porous or cage-like structure, the malodor.

Numerous compounds, which range from non-descript plant extracts to single and multiple chemical entities, have been touted to reduce the sensory perception of malodors. For example, U.S. Pat. No. 3,077,457 to Kulka discloses fumaric acid esters as malodor counteractants, while U.S. Pat. No. 4,187,251 to Kulka discloses esters of alpha-, beta-unsaturated monocarboxylic acids as malodor counteractants. U.S. Pat. No. 3,923,005 to Fry et al. discloses the use of chlorophyll to remove the smell from used cat litter, while U.S. Pat. No. 4,989,727 discloses a malodor counteractant consisting of deodorizing ingredients extracted from plants and is said to be useful for a wide variety of smells, including sulfur and nitrogen compound odors. Other compounds disclosed to be useful as malodor counteractants include water-soluble organic polymers having an average molecular weight of at least 100,000 (U.S. Pat. No. 4,909,986 to Kobayashi et al.), a mixture of an acid anhydride with a copper compound (U.S. Pat. No. 4,959,207 to Calhoun), a,Ω-alkanedicarboxylic acids and moncarboxylic acid esters of oligoglycerols (U.S. Pat. No. 5,718,887 to Wolf et al.—useful in reducing body odor), betacyclodextrin (U.S. Pat. No. 5,534,165 to Pilosof et al.), and undecylenic acid and its derivatives. U.S. Pat. Nos. 4,009,253, 4,187,251, 4,310,512, 4,622,221 to Schleppnik disclose the use of 4-cyclohexyl-4-methyl-2-pentanone, alkyl cyclohexyl alkyl ketones, acetic and propionic acids, and cyclohexyl alkyl ketones, respectively, as malodor counteractants. WO 02/051788A1 (PCT/CH01/0076) discloses certain aromatic unsaturated carboxylic esters wherein the unsaturation is conjugated to both the aromatic ring and the carbonyl group portion of the carboxylic ester to be useful in the a malodor counteractants.

A particularly difficult trash to retain for ultimate disposal is diapers. Diapers are typically stored and accumulated in a container. The cumulative odor of diapers being stored within the container frequently reaches such an offensive level that the diapers must be disposed of before the container is full. The latter leads to a large use of container liners such as bags, and excessive emptying operations. Excessive emptying operation can be of particular concern as one hesitates to leave the infant unattended or to carry the infant and the soiled diapers to a remote location. A further problem associated with such containers is that the containers themselves over time tend to retain the malodor even when no diapers are present in the containers. Therefore a thorough and complete cleaning of such containers is often necessary to reduce the lingering odor. Further, as many diaper disposal receptacles are not child-proof, toddlers playing around the container may inadvertently open the container to allow odors to escape or the child may reach in to touch solid diapers.

Numerous receptacles have been proposed for temporarily holding diaper waste. These receptacles typically employ one of several approaches to reduce the emanation of malodor from the receptacle, which may be characterized as the use of making agents, odor sorbent material, inner lids or seals, air locks or sealed packaging.

The scented diaper pail has been commercially available for many years. Scent is added to the diaper pail in the hope of hiding the smell of the malodor by producing a smell that masks the malodor to the olfactory senses. The problem with such pails is that the masking smell itself can often become irritating to the consumer, as well as the fact that most scented diaper pails loose their masking effect after a period of time.

An odor sorbent effect relies on chemical absorption or adsorption or of accumulated odors or chemical association between the malodor and the sorbent material. An example of such approach is set forth in U.S. Pat. No. 5,174,462 to Hames which uses an activated charcoal adsorber mounted in a perforated holder beneath the container lid to adsorb malodors while the lid is closed. U.S. Pat. No. 2,411,430 to Hodson shows a diaper container including an odor absorbing material attached to a lid portion of the container. In U.S. Pat. Nos. 5,022,553 and 5,158,199 to Pontius, there is disclosed a diaper container for temporarily storing soiled diapers prior to final disposal that employs a liner comprising a pad of non-woven synthetic fibers impregnated with an odor absorbing material, such as activated carbon. U.S. Pat. No. 5,147,055 discloses a container that includes an outer lid and an interior flap carrying an activated charcoal filter to retain and absorb the odors within the container.

Receptacles employing inner lids or seals typically position the inner lid or seal between the conventional container pail and an outer lid in order to reduce leakage of odors when the outer lid is closed and/or to minimize the time during which the user is exposed to malodors accumulated in the pail while adding more waste. For example, U.S. Pat. No. 4,427,110 to Shaw Jr. includes a canister and seal insert having a plurality of slits intersecting centrically to provide flexible, sliced pie-shaped sectors adapted to be flexed downward into the canister base. The top has a handle with a deodorizer and has a frusto-conical plunger adapted to flex the sectors of insert downward so as to permit a soiled diaper to be deposited trough the sectors into the canister.

The air lock approach includes a lid that covers a first chamber, a transfer mechanism, and a second chamber for finally receiving the waste. After depositing waste into the first chamber, the user closes the lid and then actuates a transfer mechanism to transfer the waste material from the first chamber to the second chamber. For example, U.S. Pat. Nos. 5,535,913 and 5,655,680 to Asbach et al. describe a diaper pail with a constrictor located under the lid. Operation of the pail involves opening the lid, depositing the waste into the holding chamber, and closing the lid. The constrictor is then opened allowing the waste to fall from the holding chamber into the storage chamber. Finally, the constrictor is closed to prepare the pail for the next deposit of waste. Therefore, malodors from the second chamber are never directly exposed to the outside environment. Other examples of this approach are disclosed in U.S. Pat. No. 1,226,634 to Briese, U.S. Pat. No. 1,239,427 to Bunnel & Gates, and U.S. Pat. No. 1,265,148 to Warren.

The sealed packaging approach requires a mechanism for sealing a waste in a liner bag attached to the disposal receptacle. An example of such device is the Turn N Seal Diaper Pail sold by Safety 1.sup.st (which also incorporates an inner lid). The pail has a mechanism for twisting closed the neck of a plastic liner bag used to hold the soiled diapers. U.S. Pat. No. 5,125,526 to Sumanis discloses a garbage pail in which the bag is secured to a rotatably mounted holder inside the pail, the top of the bag fastened in place so that rotation of the holder opens and closes the neck of the bag by twisting it. U.S. Pat. Nos. 6,370,847 and 6,516,588 to Jensen et al. which discloses a disposal system employing heat-sealing members moved between an open position and a closed/sealed position by either twisting an inner lid, closing the lid, or moving an activation arm. The sealing member thermally-fuse the tubing to form a sealed package containing the diaper. Individual sealed packaging may also be employed, as for example shown in U.S. Pat. Nos. 4,869,049 and 5,590,512 to Richards et al., U.S. Pat. Nos. 5,813,200 and 6,170,240 to Jacoby et al., U.S. Pat. No. 6,128,890 to Firth, U.S. patent application Ser. No. 10/138,058 (Pub. No. US2002/0162304A1, published Nov. 7, 2002) in which a container has an inner storage chamber accessed via a closable lid and an intermediate tubular core. In the Richards' individual packaging receptacle embodiment a replaceable cassette houses flexible tubing surrounding a core. While not limited thereby, an example of a representative cassette is shown in U.S. Pat. No. 4,934,529 to Richards et al. As would be understood by one of ordinary skill in the art, other cassette constructs, such as shown in U.S. Pat. No. 3,536,192 to Couper, may be employed. The flexible tubing is dispensed from the cassette. The length of flexible tubing is stored along side the core with a closed end disposed at the lower end of the core. After a diaper is deposited into the tube, the core is rotated, which twists the flexible tube to create a seal above the diaper. To dispose the next diaper the user opens the lid and inserts the diaper. The previous seal is pushed downward, and a new seal is formed by twisting the tube above the newly deposited diaper. Thus the device stores the diapers in a series of individually wrapped packages in the storage chamber, each package being separated from adjacent packages by twists in the tube.

While trash retention receptacles of the past that are conventionally stored within buildings, such as diaper retention receptacles, have employed numerous methods for reducing malodor emanating therefrom, prior art trash retention receptacles have not been found effective enough to please many users of the receptacles. Furthermore many proposed receptacles have been found not to be economically practical. For example, while certain receptacles employing masking agents or odor sorbents are initially quite efficacious in malodor counteractant activity, such agents and odor sorbents typically fail after periods of time due to exposure to the ambient environment. Replacement of the masking agent or odor sorbent is typically difficult, and the need for replacement occurs in an un-anticipatable manner and without warning. Receptacles that do not employ masking agents or odor sorbents typically do not provide malodor abatement for significant periods of time, particularly as air locks and inner lids tend either fail ab initio or over time to effectuate a hermetic seal, and the materials comprising the devices which employ air locks, inner lids, and/or package sealing mechanisms alone often become contaminated with malodors themselves.

There is a need for an improved apparatus for temporarily storing waste before ultimate disposal, in particular waste such as diapers contaminated with fecal material and urine. Preferably such devices would provide malodor abatement using masking agents and/or sorbents in a manner such that the activity of the masking agents and/or sorbents is not quickly degraded by ambient conditions. Furthermore, preferred devices would provide for periodic replacement of the sorbents and/or masking agents used in the device without an unanticipated recognition of the need to replace the same, and without unanticipated failure. Lastly, a preferred device should be designed to efficiently mitigate malodor without adding great expense.

SUMMARY OF THE INVENTION

The present invention overcomes many of the problems associated with prior art temporary waste storage receptacles by providing enhanced malodor mitigation by way of incorporating malodor counteractants into or on a replaceable cassette that houses tubular flexible plastic for use in sealed packaging and individual sealed packaging apparatuses. Such construct may provide significantly enhanced protection against the emission of malodors from the waste receptacle, and overcomes the problem of determining when the malodor counteractant needs to be replaced by associating an amount of malodor counteractant sufficient to counteract malodor release with the amount of tubing enclosed within the cassette. That is, new malodor counteractant is added to the temporary waste storage receptacle each time the cassette is replaced, i.e. when the tubing runs out. In particular there is provided an improved cassette for storing flexible tubing packed therein in layered form, wherein the improvement comprises a malodor counteractant incorporated into or on said cassette.

In one embodiment there is provided a container holding a supply of plastic, tubular stock for the incremental withdrawal of portions thereof, said container comprising a malodor counteractant which is preferably selected from the group consisting of a malodor adsorbing compound, a malodor absorbing compound, a masking agent, an cage compound (a compound that holds a malodorous compound or element within a molecular cage of the compound). The malodor counteractant may be microencapsulated.

In another embodiment, there is provided a cassette for use in dispensing flexible tubing packed therein in layered form, the cassette comprising a rigid body formed by a central tubular core open at top and bottom, a surrounding casing wall positioned to provide a space between said tubular core and said casing wall and a base wall joining a lower end of said surrounding casing wall to the lower end of said tubular core, a length of flexible tubing packed profusely in a tightly layered mass in said space to constitute a pack surrounding said tubular core, and a cap placed over a portion of said pack, said cassette comprising a malodor counteractant. Again the malodor counteractant may be selected from the group consisting of a malodor adsorbing compound, a malodor absorbing compound, a masking agent, a cage compound. The cap of such cassette may be adjoined to said central tubular core or to said casing wall, or less preferably to the base. The malodor counteractant may be found in or on said central tubular core, surrounding casing wall, the base wall, the cap, the flexible tubing, or the space between said tubular core and surrounding casing wall. The malodor counteractant may also be placed in a layer deposited on a feature of the cassette selected from the group consisting of: the central tubular core, the casing wall, the base wall, the cap, the flexible tubing, the space between the tubular core and surrounding casing wall. In one embodiment the malodor counteractant is microencapsulated.

In yet another embodiment there is provided a cassette for use in dispensing flexible tubing packed therein in layered form, the cassette comprising a rigid body formed by a central tubular core open at top and bottom, a surrounding casing wall positioned to provide a space between the tubular core and the casing wall and a base wall joining a lower end of the surrounding casing wall to the lower end of the tubular core, a length of flexible tubing packed profusely in a tightly layered mass in the space to constitute a pack surrounding the tubular core, a cap placed over a portion of the pack, and a layer on the surface of the cassette comprising an encapsulated malodor counteractant.

BRIEF DESCRIPTION OF THE DRAWINGS

A more complete appreciation of the invention and advantages thereof will be more readily apparent by reference to the detailed description of the preferred embodiments when considered in connection with the accompanying figures, wherein.

DETAILED DESCRIPTION OF THE INVENTION

Figure 1A:
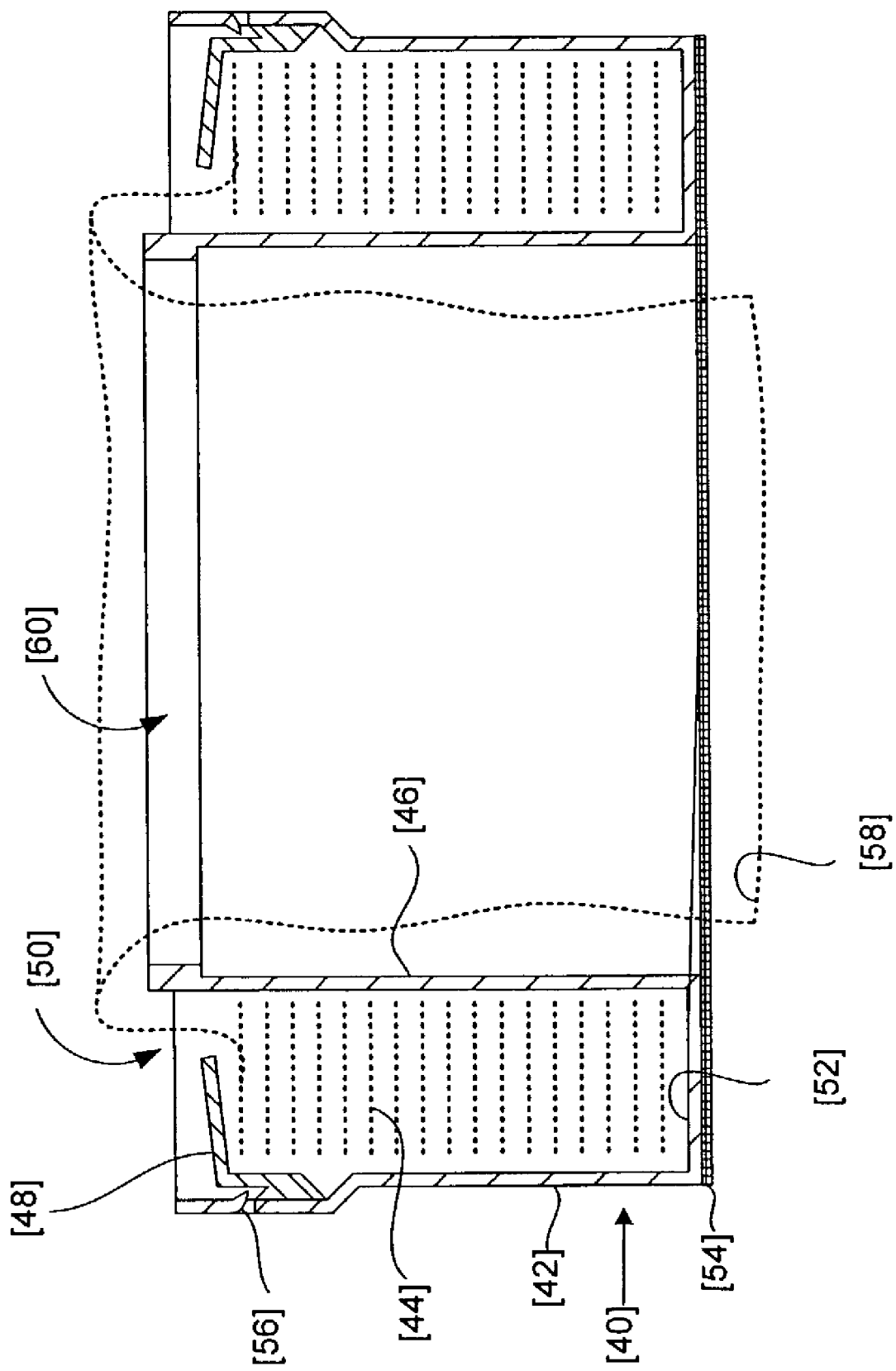
FIG. 1A is a first embodiment cassette for storing tubular flexible plastic having a gasket containing one or more malodor counteractants.

There is provided in one embodiment of the present invention malodor counteractant stored in or on the material comprising the tubular flexible plastic storage cassette. The material for example may be stored in or on the casing wall of the cassette, any annular cap that may exist on the cassette, on or in the tubular flexible plastic stored in the cassette, or in or on the tubular core. As would be understood by one of ordinary skill in the art, whether deposition of the malodor counteractant is preferably made within the material comprising the cassette, or on such material, may depend on the ability of the malodor counteractant to effectuate its activity when incorporated into the material comprising the cassette and its ability to withstand the molding temperatures.

In another embodiment of the present invention, the malodor counteract is stored in a gasket or layer attached to the cassette housing, preferably on a top or bottom portion of the cassette. The gasket or layer should be composed of a material that easily adsorbs or absorbs the malodor counteractant, or which easily incorporates the malodor counteractant, and which allows substantial release of the malodor counteractant over time.

In yet another embodiment of the present invention, the malodor counteractant is housed in a slow-release film, and the encapsulated malodor counteractant is applied to a portion of the cassette. The film may react with ambient conditions (such as moisture in the air) to provide for slow release of the malodor counteractant. In another preferred embodiment the encapsulation is of the type that will break when friction is encountered. In such embodiment, it is preferred that the encapsulated malodor counteractant be placed in a position of the cassette which will be exposed to friction when the cassette is turned in operation of the sealed packaging and individual sealed packaging apparatus, for example the bottom portion of the cassette. Thus as the cassette is turned a portion of the encapsulates will break releasing a fresh quantity of malodor counteractant.

Slow release films of the malodor counteractants and microencapsulation of the malodor counteractants may be produced by any of the methods known to those of ordinary skill in the art. For example, U.S. Pat. No. 3,655,129 to Seiner discloses various coatable films which have entrapped within their polymeric matrix minute droplets of a liquid non-solvent, such droplets which may comprise fragrances and deodorants. U.S. Pat. No. 4,898,633 to Doree et al. discloses articles comprising a thermoplastic substrate bearing rupturable microcapsules in a binder on at least one surface thereof. U.S. Pat. No. 4,254,179 teaches a method for impregnating a porous foam product with a fragrance which is released over an extended period of time. The encapsulated particles of fragrance are preferably frangible so that the external forces break the capsules to release the fragrance. Many other processes exist for manufacturing microcapsules including those described in U.S. Pat. Nos. 3,516,846, 3,516,941, 3,778,383, 4,087,376, 4,089,802, 4,100,103, and 4,251,386 as well as British Patent Specification Nos. 1,156,725, 2,041,319 and 2,048,206. As would be understood by one of ordinary skill in the art, the most advantageous technique to produce the microencapsulated malodor counteractant would depend on the chemical characteristics of the particular malodor counteractant selected for encapsulation.

In yet another embodiment, the malodor counteractant is stored in a dispensing housing through which the tubular flexible plastic courses, such that a measured amount of malodor counteractant is released each time a measured amount of tubular flexible plastic is dispensed from the cassette. The malodor counteractant may be released onto the tubular flexible plastic, or may be released into the ambient environment.

According to yet another embodiment of the invention, the malodor counteractant is incorporated into or on the tubular flexible plastic stored in the cassette itself. Packages formed using the tubular flexible plastic stored in the cassette in many cases provide unexpectedly good malodor reduction capacity when compared to packages comprising the same tubular flexible plastic which is not dispensed from the cassette. The latter may be due to the fact that the malodor counteractants are not exposed to the ambient environment as long as their non-housed counterparts, thus they are not exposed as long to components of the ambient environment (such as moisture) which may diminish the activity of the malodor counteractant. Furthermore, the latter may be due to fact that enclosure of the counteractant-treated tubular flexible plastic in a relatively sealed environment reduces the rate at which volatile malodor counteractants volatilize into the atmosphere.

Individual packaging may be performed by incorporating twists in the flexible tubular plastic above and below a waste quantum, or by sealing above and below the waste quantum by other methods such as by thermo-sealing, or by incorporating mechanical methods of attachment, such as hook and loop technology, at points along the tubular flexible plastic to allow for sealing at such points.

The optimal malodor counteractant for any particular cassette will vary according to the materials that are to be stored in the temporary waste storage receptacle as well as the material into which the counteractant is placed or attached to. Examples of malodor counteractants that could be employed in the cassette include fumaric acid esters as disclosed, for example, in U.S. Pat. No. 3,077,457 to Kulka, alpha-, beta-unsaturated monocarboxylic acids, as disclosed, for example, in U.S. Pat. No. 4,187,251 to Kulka, chlorophyll, a mixture of an acid anhydride with a copper compound as disclosed, for example, in U.S. Pat. No. 4,959,207 to Calhoun, a,Ω-alkanedicarboxylic acids and moncarboxylic acid esters of oligoglycerols as disclosed, for example, in U.S. Pat. No. 5,718, 887 to Wolf et al., beta-cyclodextrin as disclosed, for example, in U.S. Pat. No. 5,534,165 to Pilosof et al., aromatic unsaturated carboxylic esters wherein the unsaturation is conjugated to both the aromatic ring and the carbonyl group portion of the carboxylic ester as disclosed, for example, in WO 02/051788A1 (PCT/CH01/0076), a composition of fragrance materials as set forth, for example, in European Patent Application No. 0-404470, undecylenic acid and its derivatives, 4-cyclohexyl-4-methyl-2-pentanone, alkyl cyclohexyl alkyl ketones, acetic and propionic acids, and cyclohexyl alkyl ketones, as disclosed, for example in U.S. Pat. Nos. 4,009,253, 4,187,251, 4,310,512, and 4,622,221 to Schleppnik.

Now turning to the figures, there is seen in FIG. 1A a cassette embodiment of the present invention, cassette [40], for dispensing flexible tubular plastic which may find employment in a individual seal packaging system of the type described by Richards et al. Flexible tubular plastic [44] is stored between tubular core [46], casing wall [42] and cassette bottom [52]. Tubing [44] is dispensed through gap [50] to produce dispensed tubing [58] which exists the cassette [38] through opening [60]. Cassette [40] of such embodiment includes an annular cap [48] which acts as a retaining cover to help retain tubing [44]. Annular cap [48] is shown in FIG. 1A to be attached to casing wall [42]. Annular cap [48] may be affixed to the body of the cassette by detent means [56]. Cassette [38] in such embodiment includes a gasket or layer [54] which comprises in or on the gasket/layer malodor counteractant.

Figure 1B:
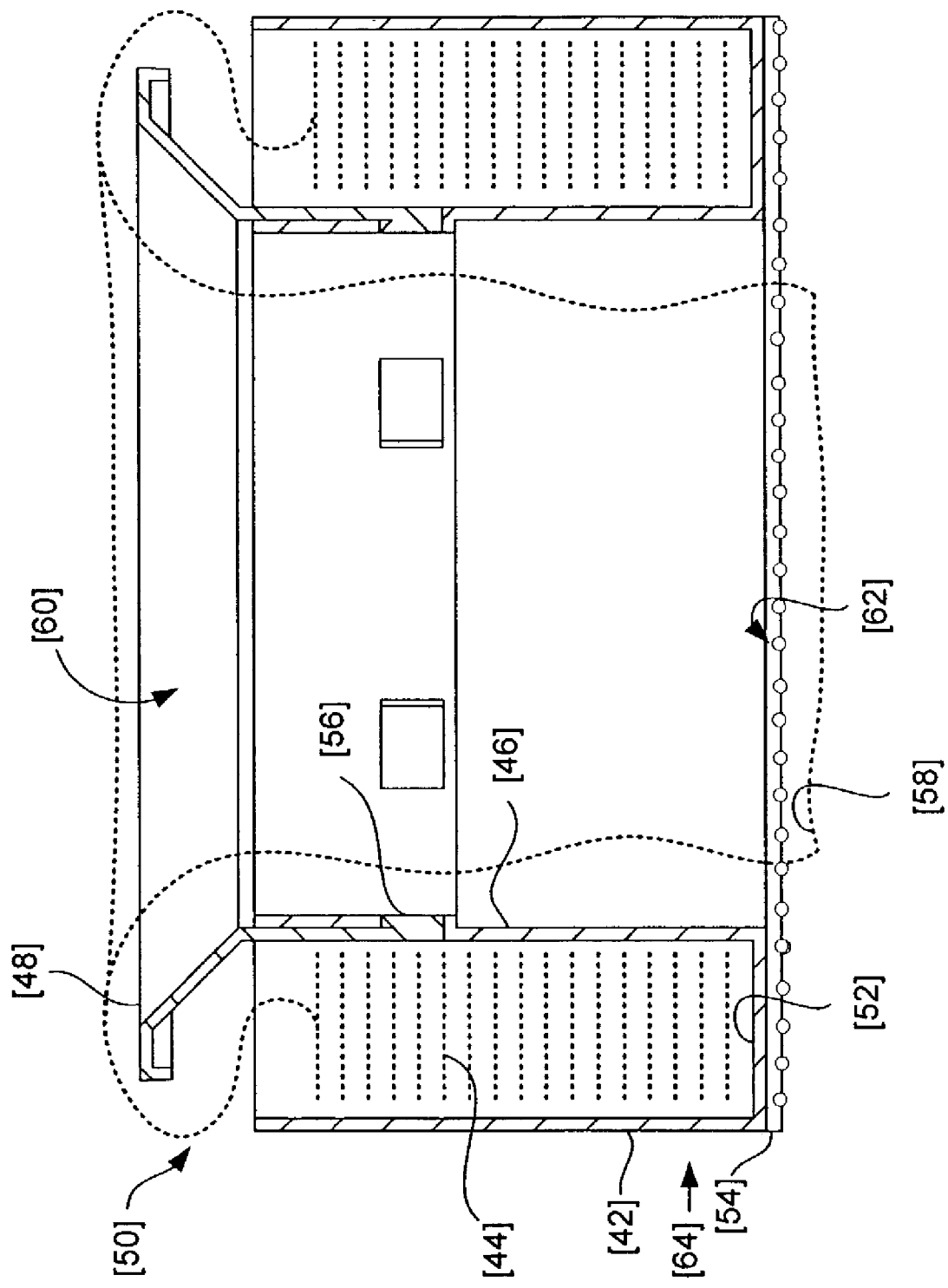
FIG. 1B is a second embodiment cassette for storing tubular flexible plastic having a gasket containing one or more malodor counteractants in microencapsulations.

Now turning to FIG. 1B, there is shown another cassette embodiment of the present invention, cassette [64] which may also be used for dispensing flexible tubular plastic and which may find employment in a individual seal packaging system of the type described by Richards et al. As in the cassette [40] embodiment of FIG. 1A, flexible tubular plastic [44] is stored between tubular core [46], casing wall [42], and bottom [52]. Tubing [44] is likewise dispensed through gap [50] to produce dispensed tubing [58] which exists the cassette [64] through opening [60]. Cassette [64] of such embodiment, however, includes an annular cap [48], which acts as a retaining cover to help retain tubing [44], but which is attached to tubular core [46]. Annular cap [48] is affixed to the tubular core [46] by detent means [56]. Cassette [64] in such embodiment includes a gasket or layer [54] which comprises in or on the gasket/layer malodor counteractant that is microencapsulated [62] allowing for controlled release of the malodor counteractant.

Figure 2:
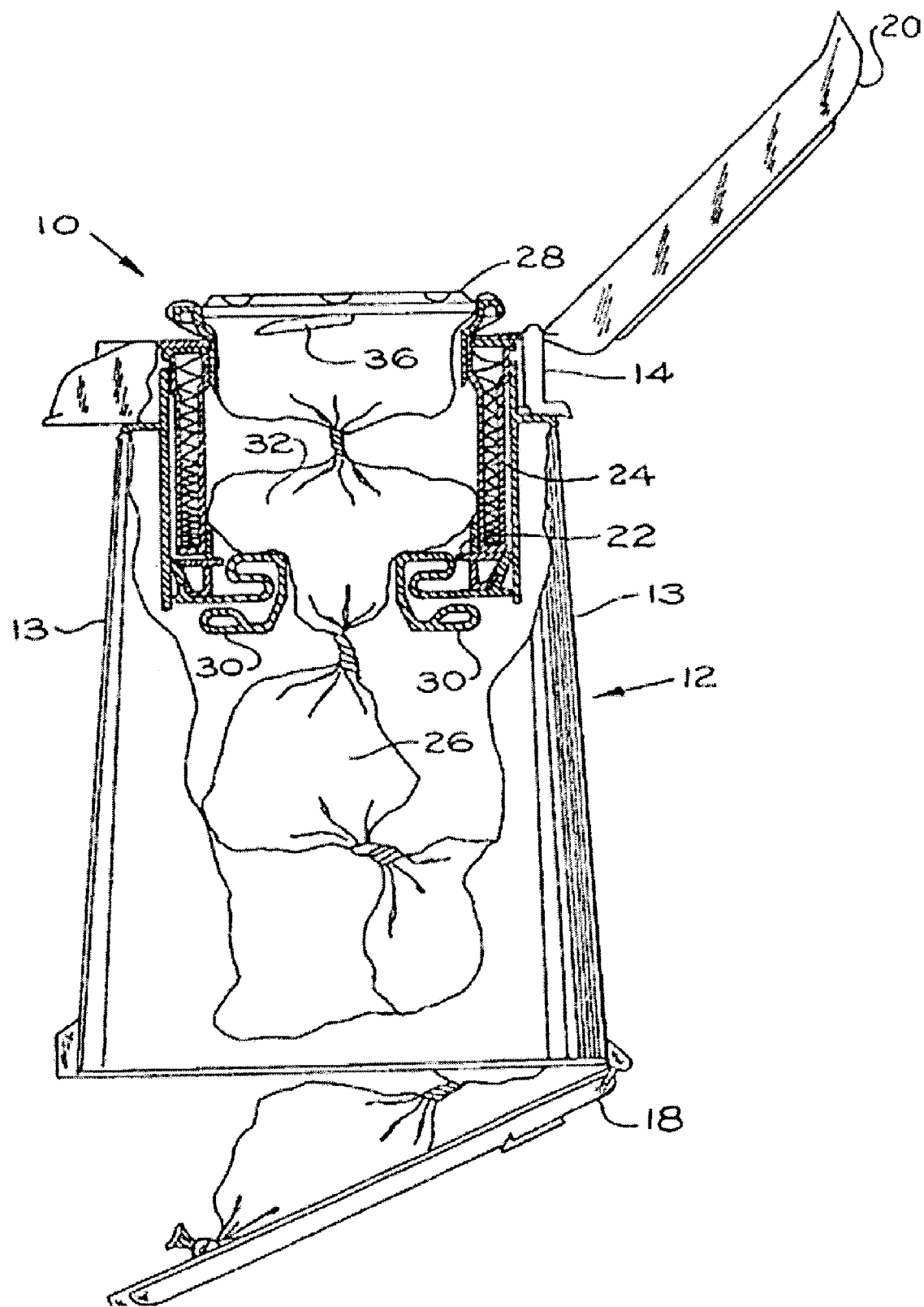
FIG. 2 is a cross-sectional view of an exemplary individual sealed packing device of the prior art.

FIG. 2 illustrates an exemplary embodiment of an individual sealed packing system of the prior art [10] in which cassettes of the present invention may be employed. The device [10] comprises a substantially cylindrical container [12] having a removable cover [14] at the top of the cylindrical container [12] and an access door [18] at the bottom of the cylindrical container [12]. The removable cover [14] has an opening covered by a hinged lid [20]. A ring-shaped flange [22] is located inside the cylindrical container [12], and a tubular core [24] rests on the flange [22]. Continuous length flexible tubing [26] is stored within the tubular core [24]. A twist rim [28] is rotatably coupled to the tubular core [24]. Rotating the twist rim [28] twists the flexible tubing [26].

A plurality of retention springs [30] are attached to the flange [22]. The retention springs [30] hold a waste package [32] within the flexible tubing [26] stationary while the twist rim [28] rotates to twist the flexible tubing [26] and seal the end of the waste package [32]. An aperture in the twist rim [28] preferably contains a clear plastic panel. In one preferred embodiment of the present invention, the twist rim [28] incorporates a cutting device [36] to sever the flexible tubing [26] when the cylindrical container [12] is filled.

The cover [14] is removably attached to the cylindrical container [12]. When the cover [14] is removed, an end of the flexible tubing [26] can be removed from the roll of flexible tubing [26] contained within the tubular core [24] and knotted. This knot of flexible tubing [26] is then placed into the cylindrical container [12] through the flange [22] toward the bottom of the cylindrical container [12] and forms a bag for storing waste packages [32]. Waste packages [32] are placed into the bag formed by flexible tubing [26], and the flexible tubing [26], together with the waste package [32], is held stationary by the plurality of retention springs [30] inside of the cylindrical container [12] coupled to the flange [22].

Throughout this specification, the word "comprise" or variations such as "comprises" or "comprising" will be understood to imply the inclusion of a stated integer or group of integers but not the exclusion of any other integer or group of integers.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

What is claimed is:

1. A cassette for use in dispensing flexible tubing packed therein in layered form, the cassette comprising:
   a rigid body formed by a central tubular core open at top and bottom, a surrounding casing wall positioned to provide a space between said tubular core and said casing wall and a base wall joining a lower end of said surrounding casing wall to a lower end of said tubular core, a length of flexible tubing packed in a layered mass in said space to constitute a pack surrounding said tubular core, said length of flexible tubing being dispensed in individual lengths from the cassette so that each of said individual lengths of flexible tubing are sealable to form a series of individually wrapped packages, and a cap placed over a portion of said pack, said cassette comprising a malodor counteractant,
   wherein said malodor counteractant is found in a layer deposited on a feature of the cassette selected from the group consisting of: the central tubular core, the casing wall, the base wall, the cap, the space between said tubular core and surrounding casing wall, and any combination thereof, and
   wherein said malodor counteractant is in an amount sufficient to counteract malodor for all of said individual lengths of said flexible tubing enclosed within the cassette.

2. The cassette of claim 1, wherein said malodor counteractant is microencapsulated.

3. A cassette for use in dispensing flexible tubing packed therein in layered form, the cassette comprising:
   a rigid body formed by a central tubular core open at top and bottom, a surrounding casing wall positioned to provide a space between said tubular core and said casing wall and a base wall joining a lower end of said surrounding casing wall to a lower end of said tubular core, a length of flexible tubing packed profusely in a tightly layered mass in said space to constitute a pack surrounding said tubular core, a cap placed over a portion of said pack, said base wall having a first surface within said space and a second surface opposite said first surface;
   a gasket connected to said second surface; and
   a malodor counteractant connected to said gasket that is microencapsulated allowing controllable release of said malodor counteractant.

4. A cassette comprising:
   a rigid body formed by a tubular core open at a first end and a second end, a casing wall that is tubular and concentrically surrounds said tubular core to provide a space between said tubular core and said casing wall and a base wall joining a casing end of said casing wall to said first end of said tubular core, a length of flexible tubing in said space, said base wall having a first surface within said space and a second surface opposite said first surface;
   a malodor counteractant being encapsulated and connected to said second surface so that as the cassette is turned in a sealed packaging apparatus, a portion of said malodor counteractant that is encapsulated breaks releasing a fresh quantity of said malodor counteractant.

5. A cassette comprising:
   a body formed by a tubular core open at top and bottom, a surrounding casing wall, positioned to provide a space between said tubular core and said casing wall and a base wall joining a lower end of said surrounding casing wall to a lower end of said tubular core, a length of flexible tubing in said space surrounding said tubular core, a cap placed over said flexible tubing on a side of said flexible tubing opposite said base wall, said flexible tubing having a malodor counteractant, said malodor counteractant being shielded from the ambient environment while said flexible tubing is in said space, said malodor counteractant being released with said flexible tubing to the ambient environment when said flexible tubing is withdrawn outside of said space.

* * * * *